United States Patent [19]

Ishida

[11] Patent Number: 5,483,392
[45] Date of Patent: Jan. 9, 1996

[54] MAGNETIC RECORDING AND OR REPRODUCING APPARATUS AND A RECORDING MEDIUM THEREOF

[75] Inventor: Takeshisa Ishida, Tokyo, Japan

[73] Assignee: Sony Corporation, Tokyo, Japan

[21] Appl. No.: 145,296

[22] Filed: Oct. 29, 1993

Related U.S. Application Data

[63] Continuation of Ser. No. 817,338, Jan. 6, 1992, abandoned.

[30] Foreign Application Priority Data

Jan. 9, 1991 [JP] Japan ............................... 3-012732

[51] Int. Cl.⁶ ......................................... G11B 5/596
[52] U.S. Cl. .............................. 360/77.03; 360/77.04; 369/126; 369/273
[58] Field of Search ........................ 360/77.03, 77.08, 360/77.06, 135; 369/126, 77.04, 44.25, 44.26, 43, 44.32, 44.37, 273

[56] References Cited

U.S. PATENT DOCUMENTS

| | | | |
|---|---|---|---|
| 4,321,621 | 3/1982 | Kinjo et al. | 369/43 X |
| 4,463,388 | 7/1984 | Sugiyama et al. | 369/43 X |
| 4,663,751 | 5/1987 | Kaku et al. | 369/109 X |
| 4,823,205 | 4/1989 | Hannon et al. | 360/77.03 X |
| 4,931,887 | 6/1990 | Hedge et al. | 360/75 |
| 4,974,109 | 11/1990 | Hoshimi et al. | 360/77.04 X |
| 5,003,415 | 3/1991 | Freeze | 360/77.04 X |
| 5,103,362 | 4/1992 | Belser et al. | 369/126 X |

Primary Examiner—Andrew L. Sniezek
Assistant Examiner—Duncan Wilkinson
Attorney, Agent, or Firm—Limbach & Limbach; W. Patrick Bengtsson

[57] ABSTRACT

The present invention is directed to a magnetic recording and/or reproducing apparatus, in which a reference electrostatic capacity is formed by a wide pattern (23) radially formed over a plurality of recording tracks (22) and a calculation is performed by utilizing this reference electrostatic capacity so as to eliminate the fluctuation of stray capacitance in each of the electrodes (63a) and (63b) of a recording and reproducing head. Thus, the change of stray capacitance occuring due to the drift of temperature, the vibration of interconnection or the like can be eliminated.

6 Claims, 5 Drawing Sheets

MAGNETIC RECORDING AND OR REPRODUCING APPARATUS AND A RECORDING MEDIUM THEREOF

This is a continuation of application Ser. No. 07/817,338 filed on Jan. 6, 1992 now abandoned.

BACKGROUND OF THE INVENTION

1. Field of the Invention

The present invention relates to a magnetic recording and/or reproducing apparatus and a recording medium thereof in which the recording track pattern is physically formed in advance.

2. Description of the Prior Art

A magnetic recording and/or reproducing apparatus and a recording medium in which a recording track pattern is formed during manufacture of the recording medium have been proposed so far. FIG. 1 schematically illustrates a recording medium (magnetic disc) on which a recording track pattern is pre-formed. In FIG. 1, reference numeral 50 depicts the entirety of a magnetic disc. The magnetic disc 50 has formed at its center an aperture 51 into which a spindle (not shown) is inserted, and recording tracks 52 made of a magnetic material are concentrically formed around the aperture 51. A connection pattern 53 also is provided to make the respective recording tracks 52 equal in electrostatis potential. When the above-mentioned magnetic disc 50 is produced, a magnetic material having conductivity is deposited on the whole upper surface of a disc-shaped glass plate 54 in a layer fashion by a sputtering-process and then a necessary recording track pattern is formed on the magnetic disc 50 by some suitable process such as an etching-process or the like.

For the magnetic disc 50 thus arranged, the recording track 52 is recorded and/or reproduced and the tracking also is performed as follows.

FIG. 2 shows a perspective view of an example of a recording and reproducing head. In FIG. 2, reference numeral 60 generally depicts a recording and reproducing head. The recording and reproducing head 60 iS composed of a magnetic head 61 of a single pole for effecting the vertical magnetization and a slider portion 62 which serves also as a feedback portion of a magnetic line of force. On the lower surface of the slider portion 62, there are formed predetermined grooves which are used to float the entirety of the recording and reproducing head 60 from the magnetic disc 50 by effectively utilizing an air film. Electrodes 63a and 63b for generating electrostatic capacity between them and the magnetic material forming the recording track 52 are provided on the lower surface of the slider portion 62 at the positions opposing the respective sides of the recording track 52 when the magnetic head 61 is opposed to the recording track 52. By means of a supporting arm 64, the recording and reproducing head 60 is coupled to a head driving means which will be described later.

FIG. 3 shows partly in block form an example of an arrangement of a head driving circuit. Referring to FIG. 3, conductors led out from the above-mentioned electrodes 63a and 63b are both connected to an electrostatic capacity detector 71 which detects electrostatic capacities Ca and Cb corresponding with the areas in which the electrodes 63a and 63b are opposed to the magnetic material forming the recording tracks 52. These electrostatic capacities Ca and Cb are supplied to an adder 72 and a subtracter 73, from which there are derived an added value C+ and a subtracted value C−, respectively. Then, the added value C+ and the subtracted value C− are supplied to a divider 74 which derives a calculated value (C−/C+).

Track moving information from a central processing unit (CPU) or the like, not shown, is supplied to a control circuit 75 and the difference of an output signal from the control circuit 75 and the above-mentioned calculated value (C−/C+) is supplied from a subtracter 76 to a driver circuit 77. A driving signal from the driver circuit 77 is supplied to a head driving means 78 which is coupled to the recording and reproducing head 60 by means of the aforementioned supporting arm 64. The recording and reproducing head 60 is thereby moved along the recording tracks 52 on the basis of the control signal from the control circuit 75. Simultaneously, the tracking control is performed in a manner such that the areas in which the respective electrodes 63a, 63b are opposed to the respective recording tracks 52 become equal. Accordingly, in this state, the center of the magnetic head 61 becomes aligned with the center of the recording track 52 and the recording track 52 is recorded and reproduced by the magnetic head 61 under this condition. During this tracking control, bad influences such as fluctuation of the floated amount of the recording and reproducing head 60 from the magnetic disc 50 and so on are eliminated because the added value C+ and the subtracted value C− are divided by the divider 74, and thus the tracking control can be carried out satisfactorily without such influences.

In the above-mentioned recording and reproducing apparatus, if a stray capacity is changed due to the drift of temperature, the vibration of interconnection or the like, then it cannot be determined whether or not such a change of stray capacity is caused by the position of the recording and reproducing head 60, resulting in a position detection error. That is, fluctuations occurred simultaneously in the two electrodes 63a, 63b such as their floating amount can be removed by the above-mentioned division. This division cannot eliminate the change of the stray capacity due to the drift of temperature, the vibration of interconnection and so on because they take place in each of the electrodes 63a, 63b independently.

OBJECTS AND SUMMARY OF THE INVENTION

Accordingly, it is an object of the present invention to provide an improved magnetic recording and/or reproducing apparatus and recording media thereof in which the aforementioned shortcomings and disadvantages encountered with the prior art can be eliminated.

More specifically, it is an object of the present invention to provide a magnetic recording and/or reproducing apparatus and recording media thereof in which a fluctuation due to the influence of stray capacity can be avoided.

It is another object of the present invention to provide a magnetic recording and/or reproducing apparatus and recording media thereof in which a position detection error can be avoided.

It is a further object of the present invention to provide a magnetic recording and/or reproducing apparatus and recording media thereof in which a satisfactory tracking control can be constantly carried out by the simple arrangement.

As a first aspect of the present invention, there is provided a combination of a magnetic recording and reproducing apparatus, which includes a magnetic head, and a magnetic recording medium on which a pattern of a recording track is formed for recording and reproduction. The combination according to the invention includes a radially extending pattern of a predetermined width formed over the recording track and tracking means for detecting a change of an electrostatic capacity between the recording track and an electrode unitarily formed with the magnetic head, the tracking means including compensating means for detecting changes of the electrostatic capacity between the radially extending pattern and the electrode and subtracting such changes from a detected change of the electrostatic capacity between the recording track and the electrode to thereby compensate for non-positional causes of a change in the electrostatic capacity.

In accordance with a second aspect of the present invention, a recording medium is provided in which a pattern of plurality of recording tracks are formed for recording and reproduction, with a plurality of radially extending patterns of a predetermined width being formed over the recording tracks so that a reference electrostatic capacity is formed by the radially extending patterns.

The preceding and other objects, features, and advantages of the present invention will become apparent in the following detailed description of an illustrative embodiment thereof to be read in conjunction with the accompanying drawings.

DESCRIPTION OF THE PREFERRED EMBODIMENT

The present invention will now be described with reference to the drawings.

Figure 3:
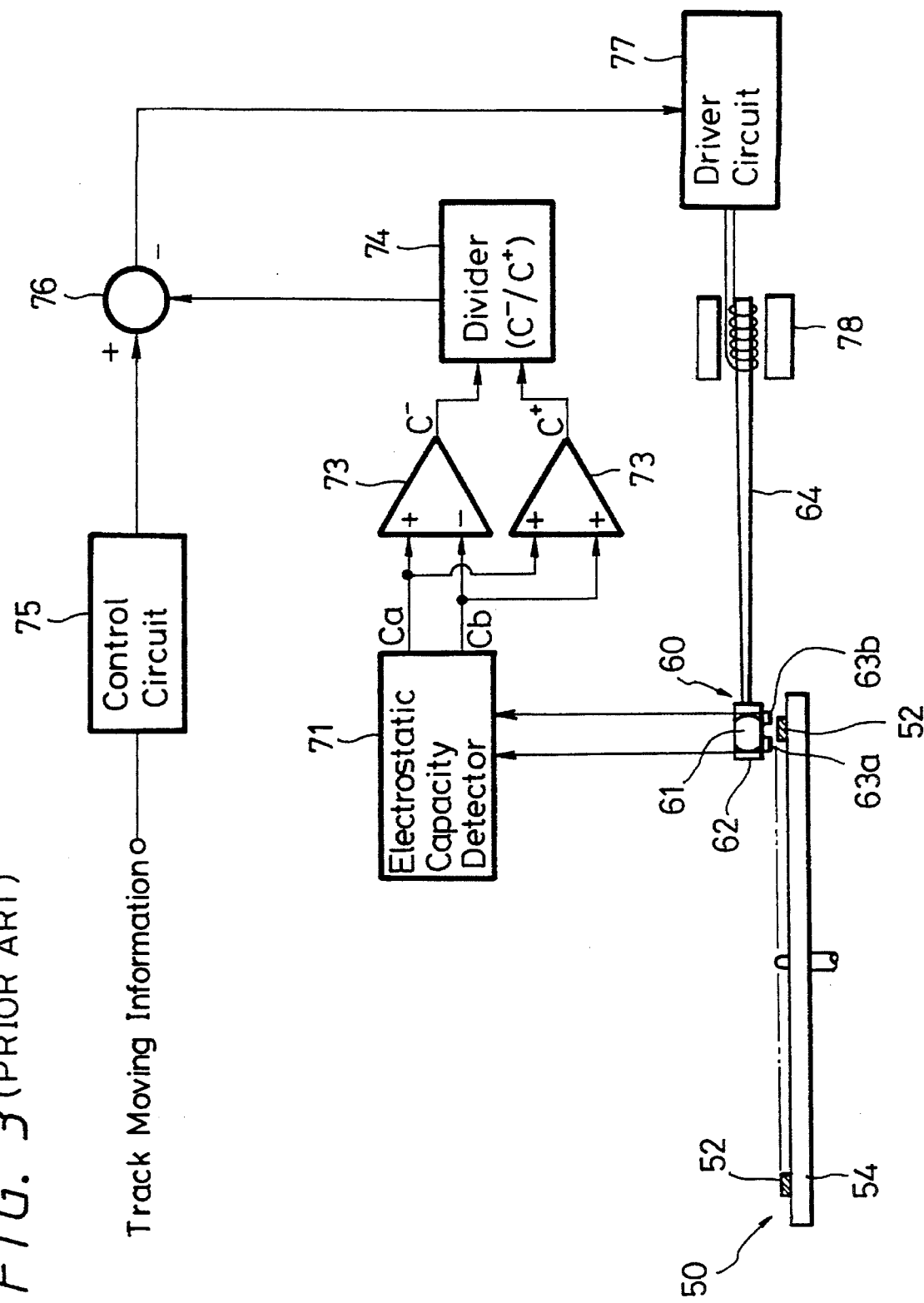
FIG. 3 is a block diagram showing an example of an arrangement of a head driving circuit according to the prior art.
Figure 4:
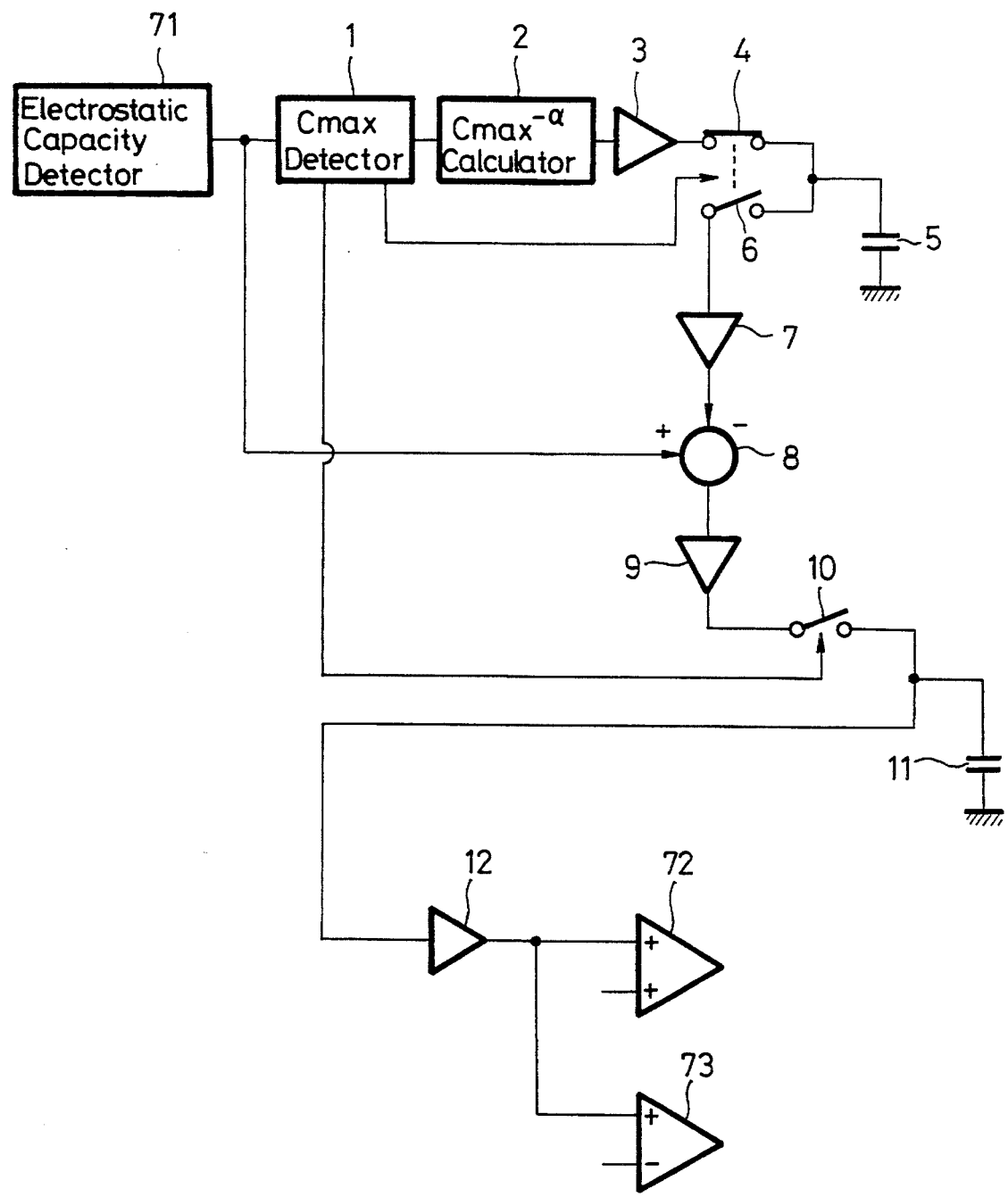
FIG. 4 is a block diagram showing a circuit configuration of a main portion of a head driving circuit according to an embodiment of the present invention.

FIG. 4 of the accompanying drawings shows a circuit which is a main portion of the present invention. This circuit has a configuration of, for example, the above-mentioned head driving circuit which is provided between the electrostatic capacity detector 71, the adder 72 and the subtracter 73 shown in FIG. 3. In this circuit configuration, a value corresponding to the electrostatic capacity Ca or Cb supplied from the electrode 63a or 63b to the electrostatic capacity detector 71 is supplied to a maximum value detecting circuit 1, as shown in FIG. 4. A maximum value Cmax detected by the maximum value detecting circuit 1 is supplied to a calculating circuit 2 which subtracts a predetermined value α from the maximum value Cmax. The difference value is supplied through a buffer amplifier 3 and a switch 4 to a grounded capacitor 5. Further, a signal indicating the timing at which the maximum value Cmax is detected by the maximum value detecting circuit 1 is output from the maximum value detecting circuit 1 and the switch 4 is turned on by this signal.

A switch 6 is provided to operate in opposite phase to that of the switch 4, and the value stored by to the capacitor 5 is supplied to a subtracter 8 through the switch 6 and a buffer amplifier 7. Further, the value from the electrostatic capacity detector 71 is supplied to the subtracter 8 and thereby the value of the capacitor 5 is subtracted from the value of the electrostatic capacity detector 71 during all times except when the maximum value Cmax is detected. The resulting difference, i.e. the compensated value is supplied through a buffer amplifier 9 and a switch 10, which is operable in equi-phase with the switch 6, to a grounded capacitor 11. Further, the value supplied to the capacitor 11 is also supplied through a buffer amplifier 12 to the adder 71 and the subtracter 73, for example. In this manner, by utilizing the reference electrostatic capacity, the fluctuation of stray capacitance is eliminated in each of the electrodes 63a and 63b of the recording and reproducing head 60.

Figure 5A:
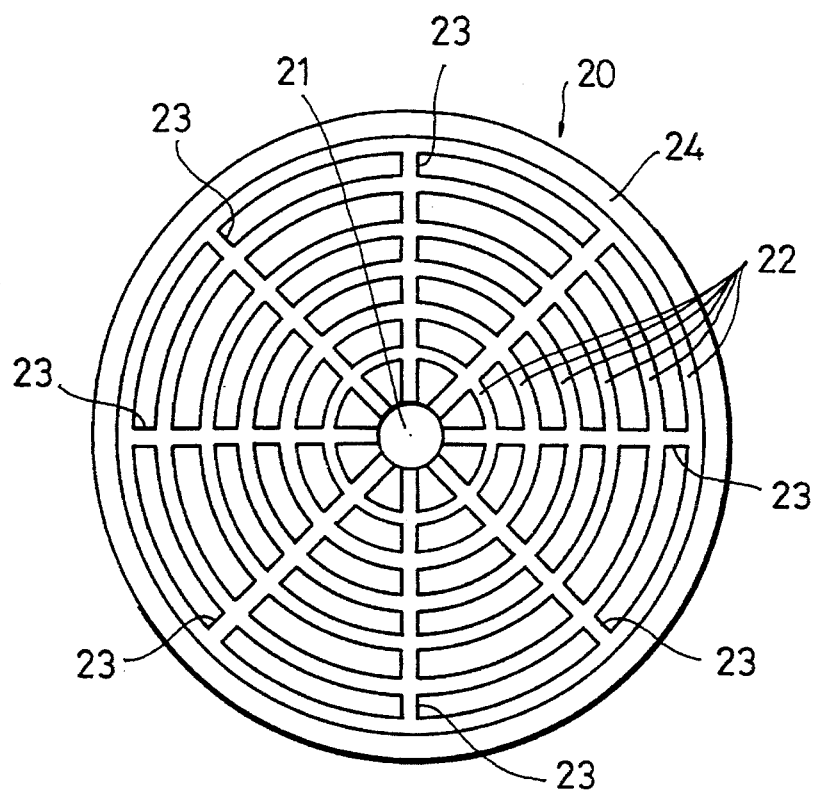
FIGS. 5A and 5B are respectively schematic diagrams showing an example of an arrangement of a recording medium according to the present invention.
Figure 5B:
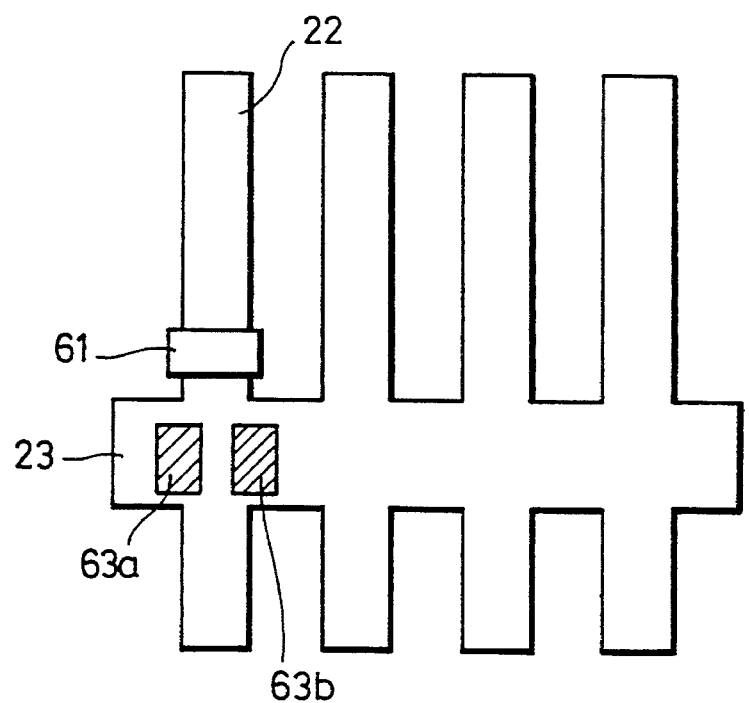

FIG. 5, which is formed of FIGS. 5A and 5B, schematically illustrates a recording medium (magnetic disc) of the present invention. In this case, FIG. 5A illustrates the entirety of this recording medium, and FIG. 5B illustrates a main portion thereof in an enlarged scale.

In FIG. 5A, reference numeral 20 generally designates a recording medium such as a magnetic disc. As shown in FIG. 5A, the magnetic disc 20 has formed at its center an aperture 21 into which a spindle (not shown) is inserted. Recording tracks 22 made of a magnetic material are concentrically formed around the aperture 21, and a plurality of radially extending patterns 23, each having a predetermined wide width, are formed to intersect the concentric recording tracks 22. That is, as shown in FIG. 5B, the patterns 23 are formed to be wide enough that each pattern 23 may be opposed to the whole surfaces of the respective electrodes 63a and 63b under the condition such that the tracking of the magnetic head 61 is carried out, for example. Incidentally, each pattern 23 can also serve as a connection pattern which connects adjacent recording tracks 22 so that the respective recording tracks 22 are held at the same electrostatic potential. When the above-mentioned magnetic disc 20 is produced, a magnetic material having conductivity is deposited on the whole upper surface of a disc-shaped glass plate 24 in a layer fashion by a sputtering process and then a necessary recording track pattern is formed on the disc-shaped glass plate 50 by some suitable process such as an etchings process or the like.

Figure 1:
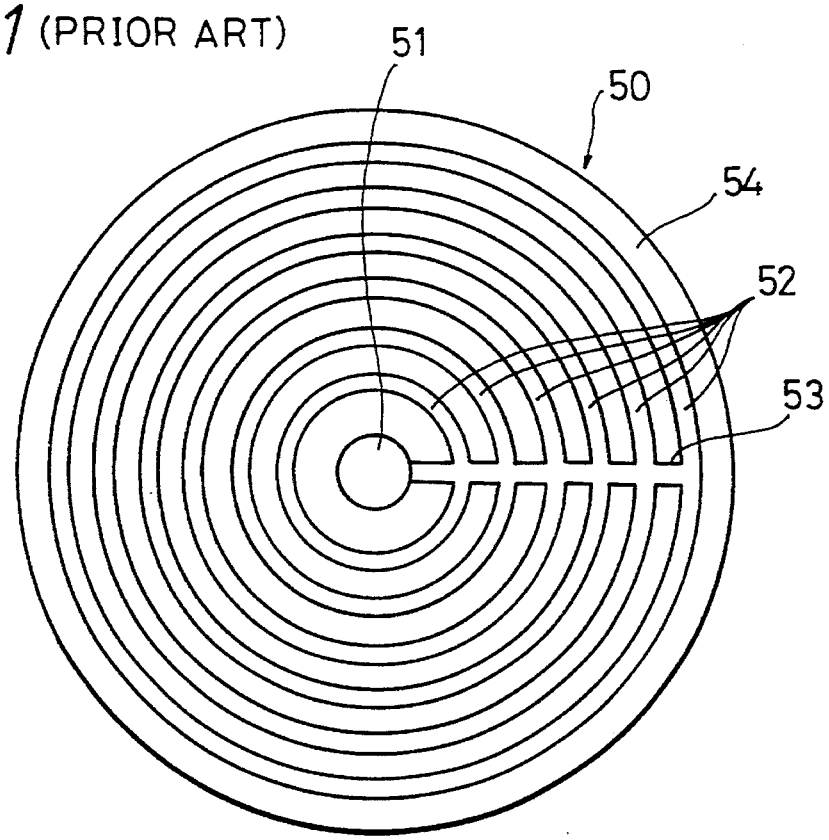
FIG. 1 is a plan view illustrating an example of a recording medium according to the prior art.
Figure 6A:
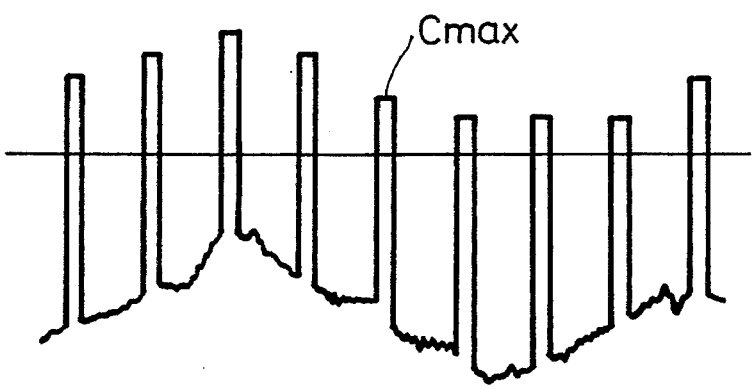
FIGS. 6A and 6B are respectively waveform diagrams used to explain the present invention.
Figure 6B:
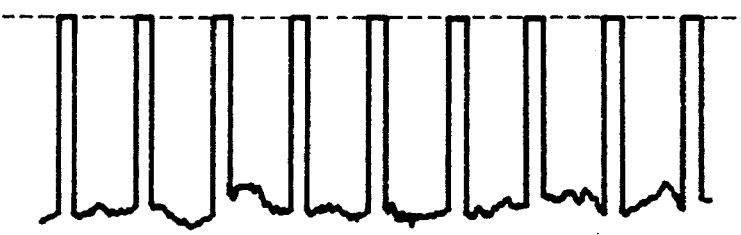
Figure 2:
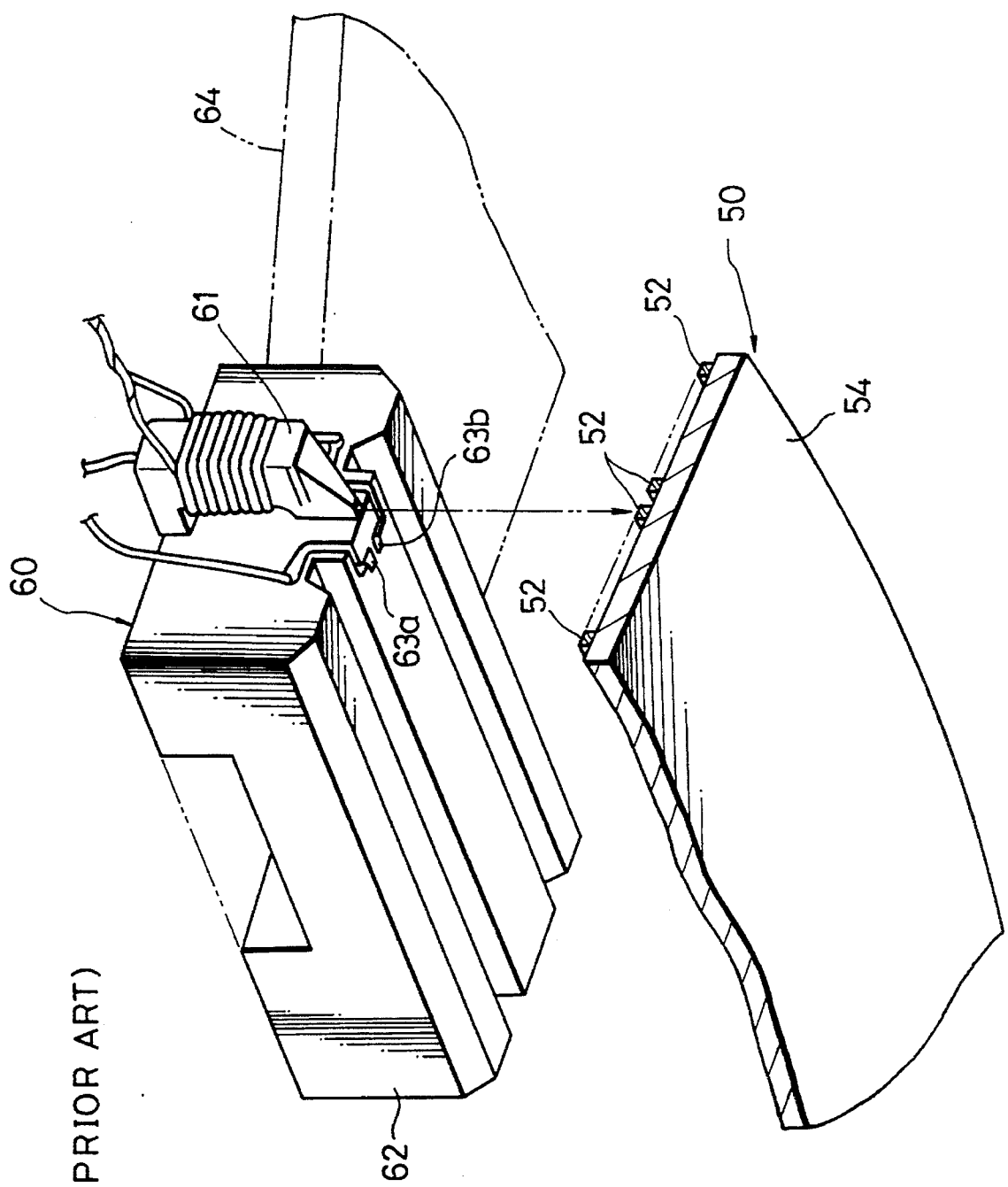
FIG. 2 is a perspective view illustrating an example of a recording and reproducing head according to the prior art.

Accordingly, owing to the combination of the magnetic disc 20 and the above-mentioned circuit, the electrostatic capacity detector 71 derives an electrostatic capacity detected value shown, for example, in FIG. 6A. An upwardly-protruded portion in FIG. 6A represents a period in which the electrode 63a or 63b is opposed to the wide pattern 23. Accordingly, although it might be supposed that the level Cmax of this upwardly-protruded portion demonstrates the maximum value of the electrostatic capacity and is constant, in reality the level Cmax of this protruded portion fluctuates as shown in FIG. 6A. This fluctuation of the level Cmax of the protruded portion is caused by the influence of the stray capacity.

Therefore, in the above circuit of the present invention, the predetermined value α is subtracted from the level Cmax of the protruded portion, the difference value is kept in the capacitor 5 and this difference value is subtracted from the detected value of the electrostatic capacity, whereby the level Cmax of the protruded portion is made equal to the predetermined value α. Consequently, by the above-mentioned circuit, the fluctuation caused by the influence of the stray capacity can be eliminated, avoiding the occurrence of position detecting error.

As described above, according to the magnetic recording and/or reproducing apparatus of the present invention, since the reference electrostatic capacity is formed by the wide pattern 23 radially formed over the recording track 22, the fluctuations of the stray capacities occuring in the respective electrodes 63a, 63b due to the drift of temperature or the like are removed by using this reference electrostatic capacity by the capacitor 5 and the subtracter 8. Therefore, the satisfactory tracking can be constantly carried out by the simple arrangement.

That is, in accordance with the magnetic recording and/or reproducing apparatus, if the repetitive cycle of the protruded portion is sufficiently shorter than the shortest cycle of the fluctuation of the stray capacity, then the influence of the fluctuation of the stray capacity can be suppressed to an extremely low level by repeating the above-mentioned operations. Accordingly, assuming that the highest frequency of the fluctuation of the stray capacity is 100 Hz and that the repetitive frequency of the protruded portion is 20 times as high as the former frequency, then it is sufficient that 33 wide patterns 23 may be provided under the condition such that the revolution rate of the magnetic disc 20 is 3600 r.p.m.

As described above, according to this invention, since the reference electrostatic capacity is formed by the wide pattern radially formed over the recording track, the fluctuation of stray capacity in each electrode due to the drift of temperature or the like can be eliminated and therefore the satisfactory tracking can be constantly carried out by the simple arrangement.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. In combination, a magnetic recording and reproducing apparatus which includes a magnetic head and a magnetic recording medium on which a pattern of a recording track is formed for recording and reproduction, the combination comprising:

a radially extending pattern of a predetermined width formed over the recording track;

tracking means for detecting a change of an electrostatic capacity between the recording track and an electrode unitarily formed with the magnetic head, the tracking means including compensating means for detecting changes of the electrostatic capacity between the radially extending pattern and the electrode and subtracting such changes from a detected change of the electrostatic capacity between the recording track and the electrode to thereby compensate for an influence of changes in a stray electrostatic capacity, wherein the tracking means includes an electrostatic capacity detector connected to the electrode for detecting the electrostatic capacity and an adder and a first subtracter, and wherein the compensating means is connected between the electrostatic capacity detector and the adder and the first subtracter and includes a maximum value detecting circuit, a calculating circuit, a first switch and a capacitor connected in series, wherein the electrostatic capacity detector supplies to the maximum value detecting circuit a first signal corresponding to the electrostatic capacity supplied from the electrode, the maximum value detecting circuit detects a maximum value of the first signal and supplies a maximum value signal to the calculating circuit where a predetermined reference value is subtracted from the maximum value signal and a corresponding first difference signal is output from the calculating circuit through the first switch to the capacitor where the first difference signal is stored, and wherein the first switch is controlled by the maximum value detector to thereafter supply the stored first difference signal from the capacitor to a second subtracter where the first difference signal is subtracted from the first signal to produce a second difference signal which is supplied to the adder and the first subtracter.

2. The apparatus according to claim 1, further comprising a second switch driven in the same phase with the first switch and connected between the second subtracter and another capacitor.

3. In combination, a magnetic recording and reproducing apparatus which includes a magnetic head and a magnetic recording medium on which a pattern of a recording track is formed for recording and reproduction, the combination comprising:

a radially extending pattern of a predetermined width formed over the recording track;

tracking means for detecting a change of an electrostatic capacity between the recording track and an electrode formed with the magnetic head, the tracking means including compensating means for detecting changes of the electrostatic capacity between the radially extending pattern and the electrode and subtracting such changes from a detected change of the electrostatic capacity between the recording track and the electrode to thereby compensate for an influence of changes in a stray electrostatic capacity, said tracking means further including an electrostatic capacity detector connected to the electrode for detecting the electrostatic capacity and an adder and a first subtracter, and wherein the compensating means includes a maximum value detecting circuit, a calculating circuit, a first switch and a capacitor connected in series, wherein the electrostatic capacity detector supplies to the maximum value detecting circuit a first signal corresponding to the electrostatic capacity supplied from the electrode, the maximum value detecting circuit detects a maximum value of the first signal and supplies a maximum value signal to the calculating circuit where a predetermined reference value is subtracted from the maximum value signal and a corresponding first difference signal is output from the calculating circuit through the first switch to the capacitor where the first difference signal is stored, and wherein the first switch is controlled by the maximum value detector to thereafter supply the stored first difference signal from the capacitor to a second subtracter where the first difference signal is subtracted from the first signal to produce a second difference signal which is supplied to the adder and the first subtracter.

4. The recording medium according to claim 3, wherein the recording medium is formed of a sputtered, conductive magnetic material on a whole upper surface of a disc-shaped glass plate.

5. The recording medium according to claim 3, wherein the radially extending patterns include a plurality of radially extending strips of magnetic material which are spaced apart from each other at equal angular intervals.

6. The recording medium according to claim 3, wherein the radially extending patterns are constituted of an electrically conductive magnetic material which is in electrical contact with each recording track.

* * * * *